(12) United States Patent
Lostlen et al.

(10) Patent No.: US 11,660,685 B1
(45) Date of Patent: May 30, 2023

(54) ADJUSTABLE DRILL JIG SYSTEM AND METHOD OF USE

(71) Applicants: Tad K. Lostlen, Morongo Valley, CA (US); James J. Lostlen, Morongo Valley, CA (US)

(72) Inventors: Tad K. Lostlen, Morongo Valley, CA (US); James J. Lostlen, Morongo Valley, CA (US)

( * ) Notice: Subject to any disclaimer, the term of this patent is extended or adjusted under 35 U.S.C. 154(b) by 785 days.

(21) Appl. No.: 16/571,850

(22) Filed: Sep. 16, 2019

(51) Int. Cl.
*B23B 47/28* (2006.01)

(52) U.S. Cl.
CPC ...... *B23B 47/287* (2013.01); *B23B 2260/088* (2013.01); *Y10T 408/55* (2015.01); *Y10T 408/567* (2015.01); *Y10T 408/56245* (2015.01)

(58) Field of Classification Search
CPC ............. B23B 47/287; B23B 2260/088; Y10T 408/55; Y10T 408/56245; Y10T 408/567
See application file for complete search history.

(56) References Cited

U.S. PATENT DOCUMENTS

| | | | | |
|---|---|---|---|---|
| 2,083,490 A | * | 6/1937 | Boker | B25H 7/02 33/675 |
| 2,342,033 A | * | 2/1944 | Barabas | B23B 47/287 408/97 |
| 2,497,733 A | * | 2/1950 | Kebour | B23B 47/287 408/109 |
| 2,592,877 A | * | 4/1952 | Ellington | B23B 47/287 D10/73 |
| 2,821,027 A | * | 1/1958 | Billhimer, Sr. | E05B 17/06 33/456 |
| 3,583,823 A | * | 6/1971 | Eaton | B23B 49/02 33/667 |
| 4,137,003 A | * | 1/1979 | Budoff | B23B 47/287 269/87.3 |
| 4,684,299 A | * | 8/1987 | Laliberte | B23B 47/287 408/72 R |
| 5,308,199 A | * | 5/1994 | Juang | B23B 47/287 408/103 |
| 5,507,607 A | * | 4/1996 | Ericksen | B23B 47/287 408/115 R |
| 5,807,036 A | * | 9/1998 | Lostlen | B23B 47/287 408/72 R |

(Continued)

FOREIGN PATENT DOCUMENTS

| | | | |
|---|---|---|---|
| CH | 230730 A | * | 1/1944 |
| DE | 9407399 U1 | * | 11/1994 |

(Continued)

*Primary Examiner* — Eric A. Gates
(74) *Attorney, Agent, or Firm* — Leavitt Eldredge Law Firm

(57) ABSTRACT

An adjustable drill jig system for drilling holes in a workpiece includes a first T-shaped element having a stem and a crossbar; a first guide engaged with the stem, the first guide having a stop plate extending perpendicular to the stem; a double bracket having a first channel and a second channel, the first channel to engage with the crossbar; an extension ruler engaged with the second channel of the double bracket and extending away from the cross bar; and a second guide having a drill bushing; the second guide is to engage with the crossbar or the extension ruler for placement of the drill bushing; and the adjustable drill jib system allows for drilling one or more holes in the workpiece.

6 Claims, 6 Drawing Sheets

(56) References Cited

U.S. PATENT DOCUMENTS

| | | | | |
|---|---|---|---|---|
| 6,343,632 | B1* | 2/2002 | Zivojinovic | B27F 5/12 |
| | | | | 144/92 |
| 8,459,906 | B1* | 6/2013 | Schmitt | B23B 47/287 |
| | | | | 408/97 |
| 9,333,642 | B2* | 5/2016 | Courtney | E05B 17/06 |
| 10,065,305 | B2* | 9/2018 | Lostlen | B25H 7/02 |
| 11,065,695 | B2* | 7/2021 | Garcia | E05D 11/0009 |
| 2003/0180106 | A1* | 9/2003 | Russell | B23B 47/287 |
| | | | | 408/110 |
| 2011/0064531 | A1* | 3/2011 | Osborne | B23B 49/023 |
| | | | | 408/103 |
| 2015/0367424 | A1* | 12/2015 | Obermeier | B23B 49/02 |
| | | | | 408/1 R |
| 2016/0101473 | A1* | 4/2016 | Lostlen | B23B 47/287 |
| | | | | 408/115 R |

FOREIGN PATENT DOCUMENTS

| | | | | | |
|---|---|---|---|---|---|
| FR | | 2838149 | A1 * | 10/2003 | ........... B23B 47/287 |
| GB | | 552501 | A * | 4/1943 | |
| WO | WO-0168301 | A1 * | 9/2001 | ........... B23B 47/287 |

* cited by examiner

ADJUSTABLE DRILL JIG SYSTEM AND METHOD OF USE

BACKGROUND

1. Field of the Invention

The present invention relates generally to systems and methods for drilling holes in workpieces, such as cabinet doors and drawers, and more specifically to an adjustable drill jig that allows for easily and efficiently positioning one or more drill bushings for drilling holes in desired locations for the installation of drawers, handles, knobs, hinges, shelfs, and the like. In addition, the system of the present invention includes an extension ruler with a stop for allowing diverse use with large doors or other workpieces.

2. Description of Related Art

Conventional methods and systems for the drilling of holes in workpieces include various tools, templates, guides and the like. Conventional methods usually involve using a device, such as a ruler, and making markings on a workpiece with a pen/pencil. During these conventional processes, the user will hold/position the ruler/measuring tape/template and make markings with the pen/pencil. The user will then remove the apparatus and proceed to drill one or more holes with a drill.

One of the problems commonly associated with these conventional methods is precision. For example, it is common for the user to shift/move slightly during the process or make a mark that is not perfectly aligned with the desired location. This can cause the holes to be drilled slightly out of place. It should be appreciated that even slight variations in the drilling of holes will cause misalignment and unappealing aesthetics of the finished workpiece.

Accordingly, it is desirable, and an object of the present invention to provide an adjustable drill jig that is versatile and allows for a variety of placements of drill bushings for the installation of handles, doors, hinges, knobs, and the like. The system of the present invention can be aligned along tops and/or edges of various shapes and sizes of doors or other workpieces, to provide precise placement of one or more drill bushings, thereby allowing for exact hole drilling.

In the preferred embodiment, the system includes a T-shaped configuration that allows for a user to position the jig on a workpiece to accommodate the location and drilling of one or more holes on either the left or right hand side of the workpiece at any corner location on the work piece or along any location on the face of the workpiece.

Thus, it is a primary objective of the invention to provide an adjustable drill jig system that is versatile and readily adaptable to a variety of drilling applications on a workpiece where a precise location or locations of a hole or holes is or are required.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
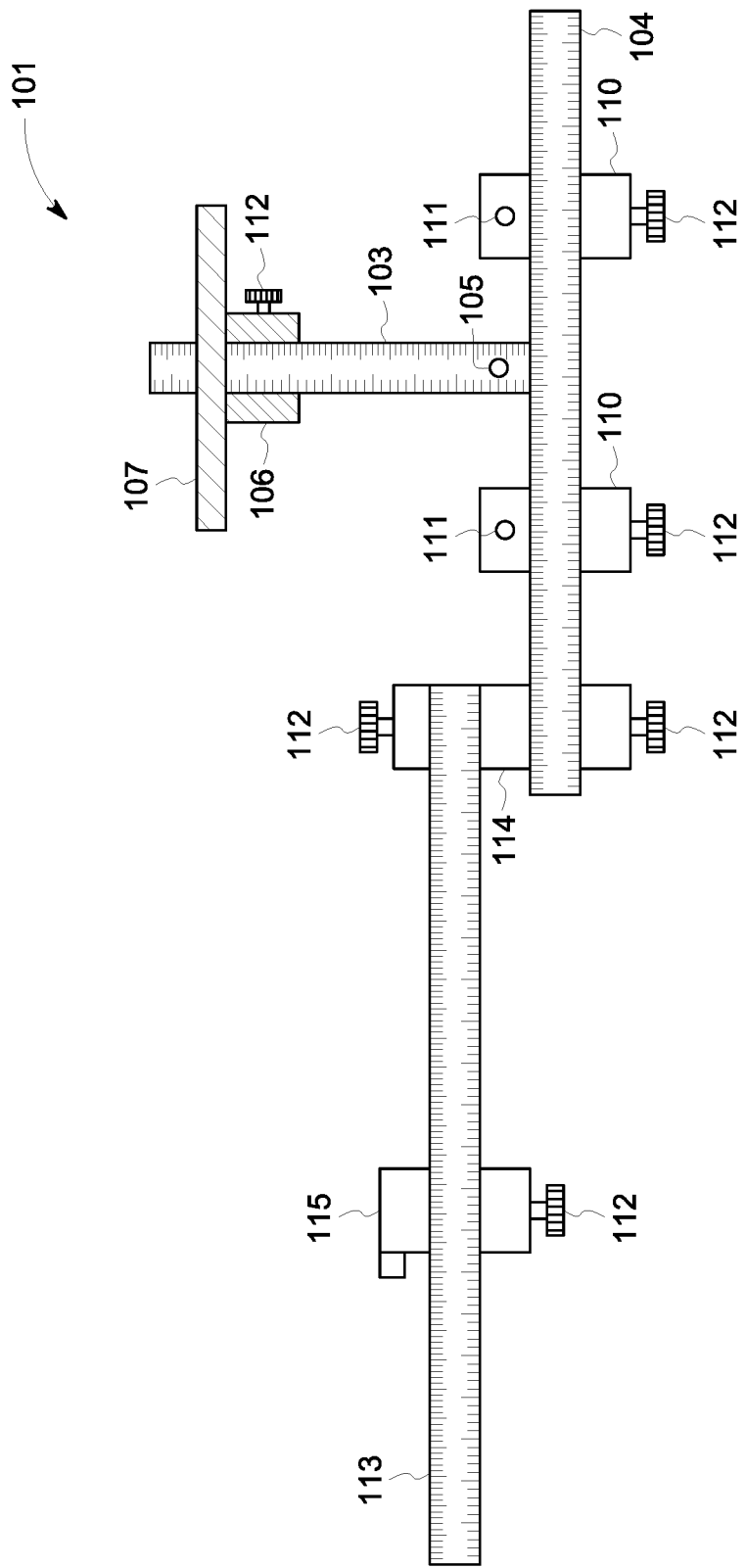
FIG. 1 is a front view of an adjustable drill jig system in accordance with a first embodiment of the present application.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional systems and methods for drilling one or more holes in a workpieces. Specifically, the system of the present invention provides for a plurality of ways to align one or more drill bushings for drilling one or more holes. The system includes, among other features, a T-shaped component that includes one or more moveable guides that can abut against an edge of a workpiece, and ruler elements to accurately align drill bushings in desired locations. In addition, the system includes an extension ruler that allows for the placement and installation of large handles or handles on large doors (as well as other uses). Further, the system includes an elongated attachment with a plurality of drill bushings for drilling a plurality of evenly spaced holes. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Referring now to the drawings wherein like reference characters identify corresponding or similar elements throughout the several views, FIG. 1 depicts a front view of an adjustable drill jig system 101 in accordance with a preferred embodiment of the present application. It will be appreciated that system 101 overcomes one or more of the above-listed problems commonly associated with conventional hole drilling systems.

In the contemplated embodiment, system 101 includes a T-shaped element with a stem 103 and a crossbar 104. It should be appreciated that the stem and crossbar can be composed of a variety of durable materials, and can be integrally secured together, such as via screws/bolts or the like, or alternatively can be molded as one piece. In the preferred embodiment, the stem 103 and crossbar 104 include ruler lines that allow for precise measurements. The ruler lines can be of any unit, such as inches and/or millimeters.

As shown, system 101 further includes a first moveable guide 106 secured to the stem. The first moveable guide 106 including a stop plate 107 that extends out and away from the stem. The moveable guide 106 further includes a tightening element 112, such as a thumb screw, that allows for the guide 106 to be adjusted up and down. The first guide 106 with the stop plate 107 allows for positioning the system 101 relative to the edge of a workpiece. For example, the top plate 107 can abut at a top of a cabinet door, thereby positioning the crossbar 104 at a desired distance from the top of the cabinet door.

System 101 further includes additional guides 110 secured to the crossbar 104. The guides 110 will further include tightening elements 112, that allow for adjustment of position as the guides are configured to slide along the crossbar to be positioned as desired by the user. As shown, in one embodiment, the guides 110 will include drill bushings 111, thereby allowing for variable placement of the drill bushings based on the needs of the user. In the preferred embodiment, the drill bushings are made from metallic materials or other hard/durable materials, thereby being configured to withstand the impact received during drilling of holes into the workpieces.

It should be appreciated that a plurality of guides 110 can be added, thereby allowing for diverse placement of drill holes. For example, the user could secure two or more guides 110 to the right of the stem and place the two or more guides 110 as desired and needed for drilling holes. In yet other embodiments, the one or more guides 110 could include stopping elements to further abut against an edge.

System 101 further includes an extension ruler 113 that is configured to secure to and extend away from crossbar 104 via a double bracket 114. This feature allows for placement of one or more drill bushings 111 a predetermined distance from a first edge (as engaged with guide 106) and a second edge, which will be engaged with a stop 115. For example, the user can secure stop plate 107 against a first edge of a cabinet and stop 115 against a second edge of a cabinet, thereby placing one or more drill bushings in desired locations. The extension ruler 113 will further include ruler lines of a predetermined unit, thereby allowing for precise measurement and placement of the drill bushings used by the user.

It should further be appreciated that additional guides 110 can be secured to ruler extension 113. The guides 110 can be placed such that they align with guides secured to crossbar 104. It should be appreciated and understood that the drill bushings can vary in size based on the needs of the user.

Figure 2A:
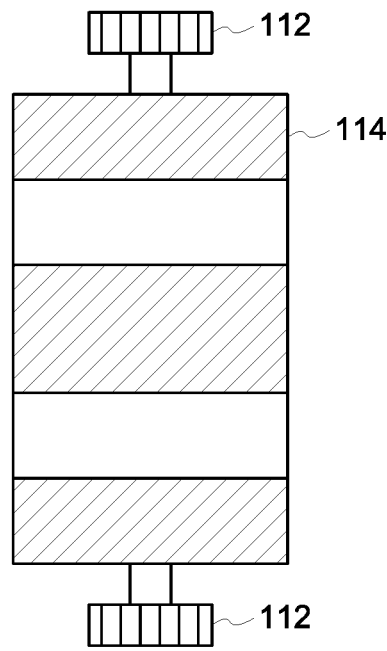
FIG. 2A is a front view of a double bracket of FIG. 1.
Figure 2B:
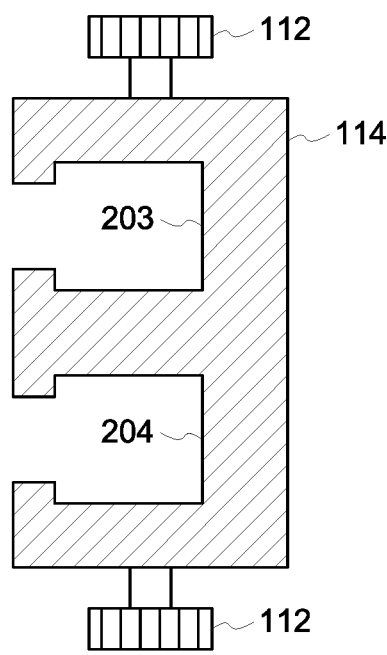
FIG. 2B is a side cross sectional view of the double bracket of FIG. 1.

In FIGS. 2A and 2B, the double bracket 114 is shown from a front and side view accordingly. As shown, the double bracket 114 can include top and bottom tightening means 112, such as thumb screws, thereby allowing for the tightening of the double bracket 114 at a desired location along the crossbar and the extension ruler. It should be appreciated that the user can align the ruler marks on the extension ruler and crossbar 104, thereby ensuring accuracy. The bracket 114 includes a first and second channel 203, 204 to receive the cross bar 104 and extension ruler 113. In the preferred embodiment, the channels 203, 204 are shaped to curve around the extension ruler and crossbar slightly for improved stability. The brackets can vary as is known in the art, while remaining configured to receive and secure to the crossbar and the extension ruler.

Figure 3A:
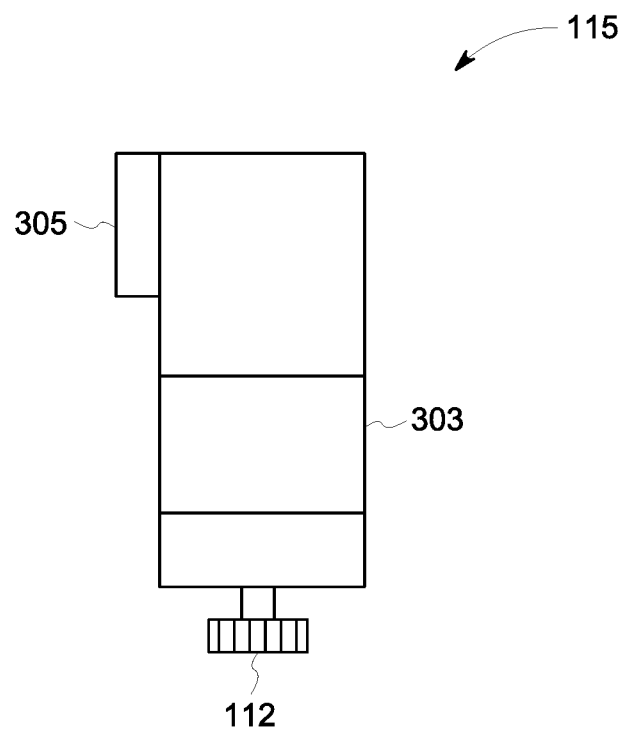
FIG. 3A is a front view of a stop of FIG. 1.
Figure 3B:
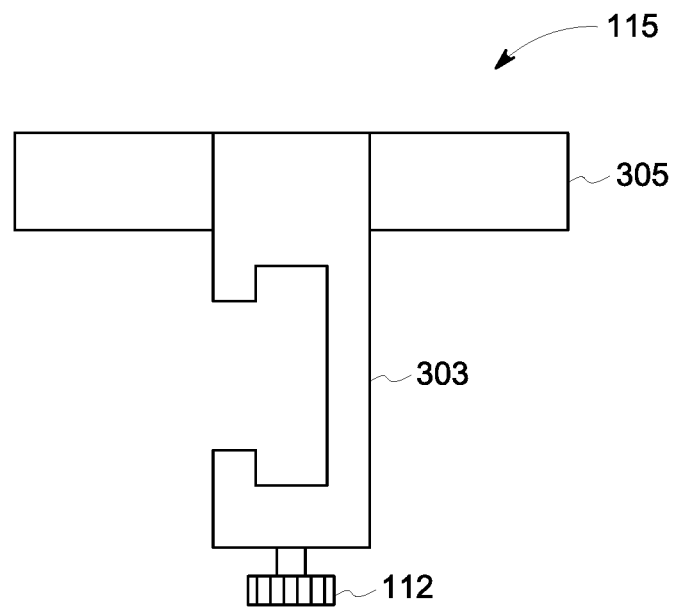
FIG. 3B is a side view of the stop of FIG. 1.

In FIGS. 3A and 3B, front and side views of stop 115 are shown. Stop 115 includes a stop plate 305 that extends outwardly, thereby providing for a structure to engage with an edge of the workpiece. As further, shown, the stop 115 will include a channel 303 for engaging with the extension ruler.

It should be appreciated that one of the unique features believed characteristic of the present application is the extension ruler, double bracket, and stop 115. This combination of features adds diversity to the T-shaped structure, as the system is more suitable for use with larger doors and the like with the extension ruler. It should further be appreciated that the length and overall dimensions of the extension ruler can vary based on the needs of the user.

Figure 4:
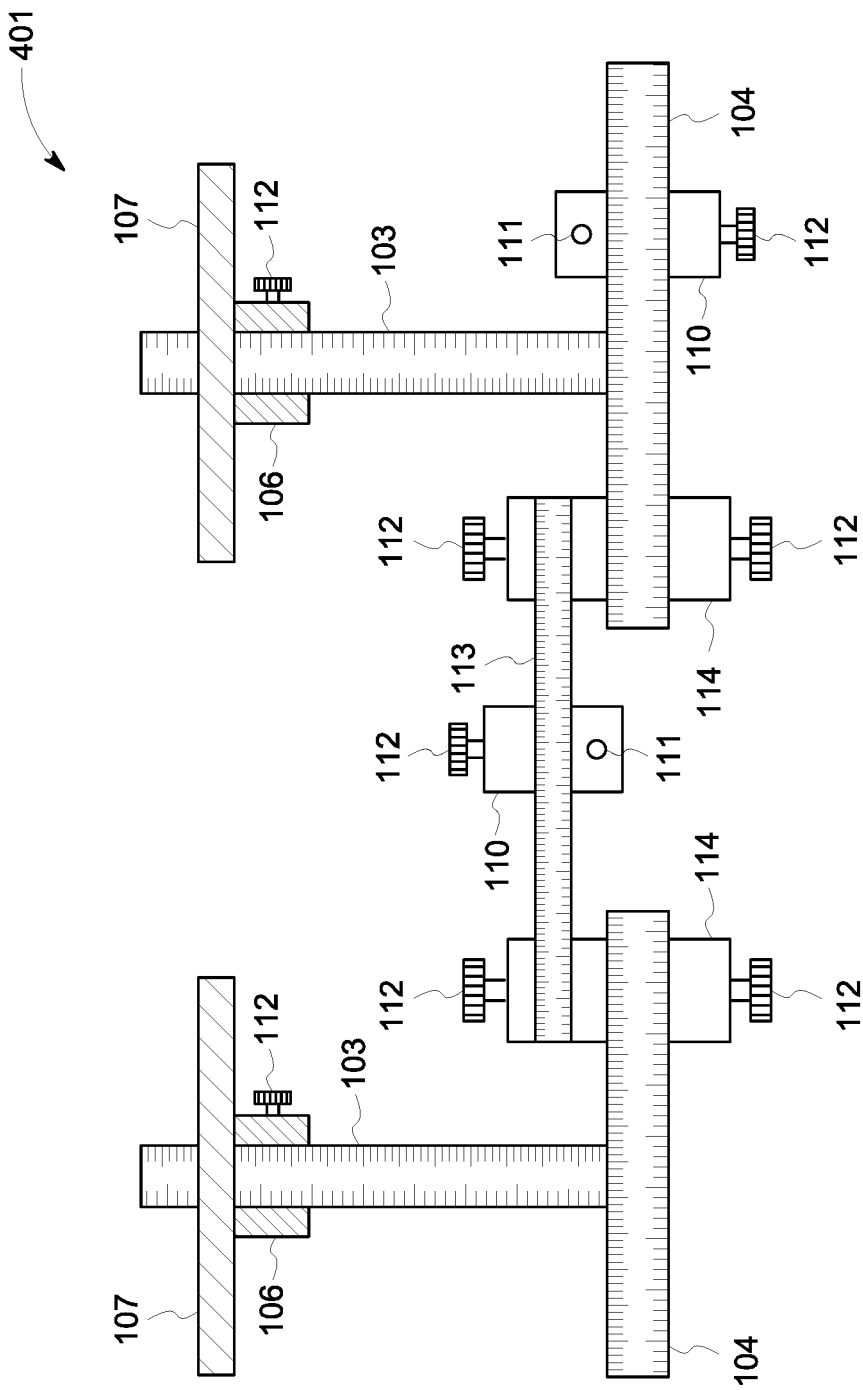
FIG. 4 is a front view of an adjustable drill jig system in accordance with a second embodiment of the present application.

In FIG. 4, a front view depicts an alternative embodiment of an adjustable drill jig system 401 in accordance with the present application. In this embodiment, two T-shaped elements are secured together via a ruler extension 113 and double brackets 114. It should be appreciated that additional T-shaped elements can be likewise secured based on desires and needs of the user. This combination allows for the user to brace against a top edge with two plates 107, thereby allowing for improved stability. The user can add any configuration of guides 110 with drill bushings 111 along the cross bars and extension ruler to drill holes in places as desired. AS shown, it should be appreciated that the drill bushings 111 are configured to align with one another when secured to the crossbar or extension ruler.

Figure 5:
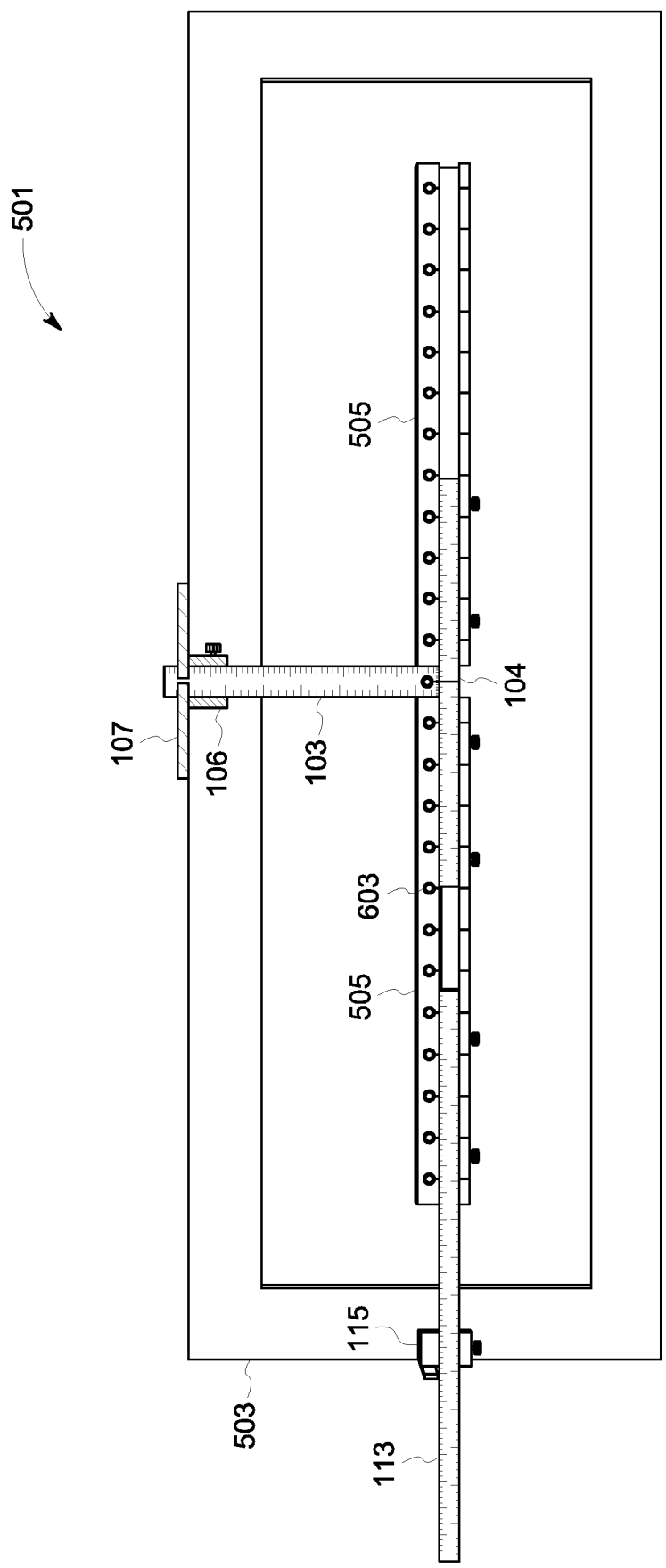
FIG. 5 is a front view of an adjustable drill jig system in accordance with a third embodiment of the present application.

In FIG. 5, a front view of yet another alternative embodiment of an adjustable drill jig system 501 is shown. System 501 includes one or more T-shaped elements having a stem 103 and cross bar 104. In this embodiment, one or more elongated attachments 505 are shown engaged with the cross bar 104. As shown, the elongated attachments 505 include a plurality of drill bushings 603. It should be appreciated that the elongated attachments 505 can be used with an extension ruler 113 and stop 115 to position the plurality of drill bushings 603 to a door 503. As shown, the top plate 107 can be positioned along an edge of the door, wherein stop 115 is positioned along another edge. The T-shaped element can be adjusted to position the elongated attachment as needed by the user for the drilling of one or more holes. The elongated attachment 505 can vary in dimensions and number of drill bushings and is composed of a durable material.

Figure 6:
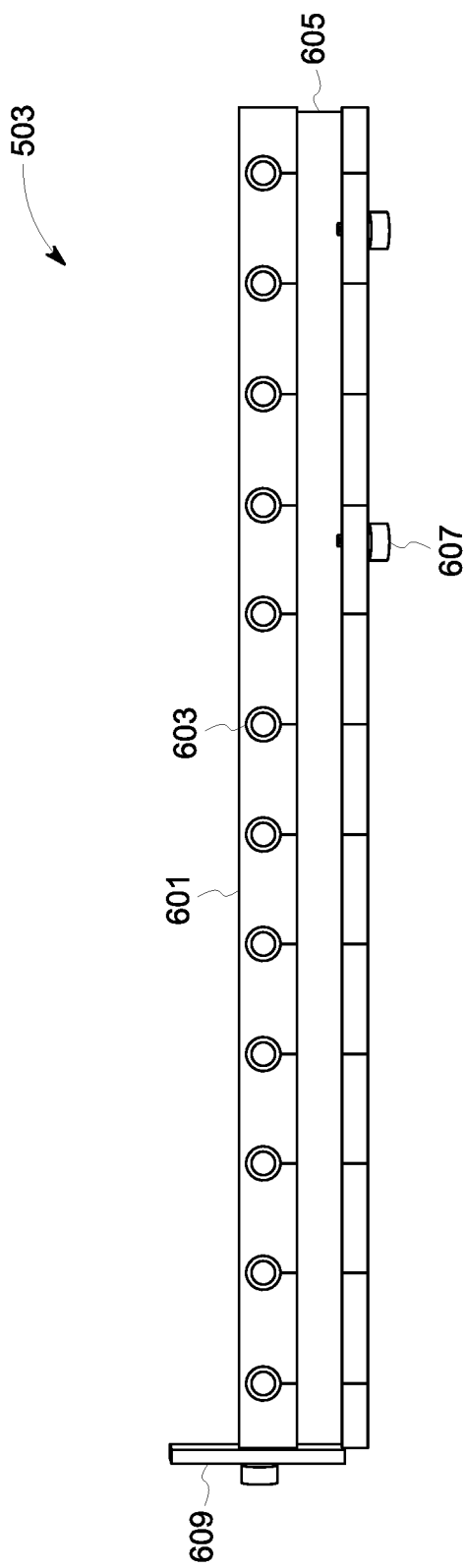
FIG. 6 is a front view of an elongated attachment of FIG. 5.

In FIG. 6, a front view further depicts elongated attachment 505, having a body 601 with the plurality of evenly spaced drill bushings 603 and a channel 605 to engage with the cross bar and/or extension ruler. As shown, one or more tightening elements 607 can be positioned to secure the elongated attachment 505 in place relative to the cross bar and extension ruler. As further shown, in some embodiments, an end stop 609 is further secured to the elongated attachment 505.

It should be appreciated that the systems of the present invention can be combined and used to position drill bushings at desired locations for a variety of workpieces, including large doors and the like.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. An adjustable drill jig system for drilling holes in a workpiece, the system comprising:
   a first T-shaped element having a stem and a crossbar;
   a first guide engaged with the stem, the first guide having a stop plate extending perpendicular to the stem, the first guide is adjustable relative to the first T-shaped element;
   a double bracket having a first channel and a second channel, the first channel to engage with the crossbar;
   an extension ruler engaged with the second channel of the double bracket and extending away from the cross bar, the extension ruler is adjustably engaged relative to the first T-shaped element; and
   a second guide having a drill bushing;
   wherein the second guide is configured to engage with the crossbar or the extension ruler for placement of the drill bushing; and
   wherein the adjustable drill jig system allows for drilling one or more holes in the workpiece.

2. The system of claim 1, wherein the first guide further includes a thumb screw configured to secure the first guide in a desired position.

3. The system of claim 1, further comprising:
   a stop engaged with the extension ruler and configured to aid in aligning the adjustable drill jig with the workpiece.

4. The system of claim 3, wherein the stop comprises:
   a channel to engage with the extension ruler; and
   a protrusion extending away from the extension ruler and configured to engage with a side of the workpiece.

5. The system of claim 1, wherein the double bracket includes one or more thumb screws to secure the double bracket to the extension ruler and the crossbar.

6. The system of claim 1, further comprising:
   a second T-shaped element engaged with the extension ruler opposite the first T-shaped element via a second double bracket.

* * * * *